A. G. FENN.
INDICATOR.
APPLICATION FILED OCT. 21, 1919.
1,348,162.  Patented Aug. 3, 1920.
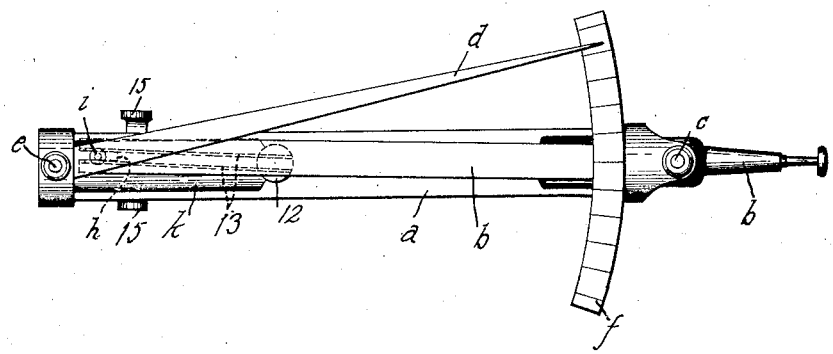
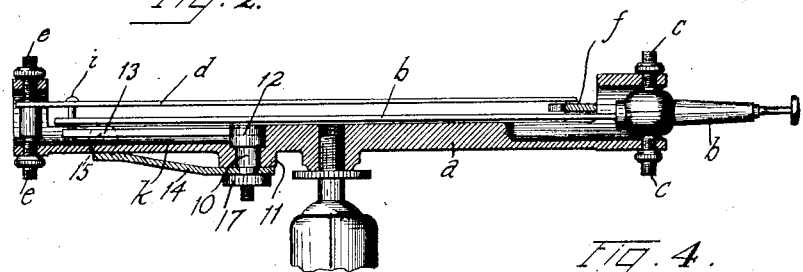
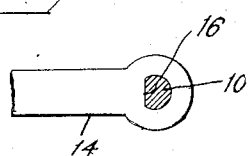
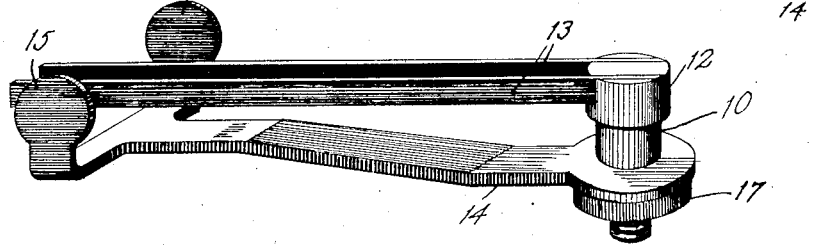
INVENTOR
Arthur G Fenn
ATTORNEY

UNITED STATES PATENT OFFICE.

ARTHUR G. FENN, OF HARTFORD, CONNECTICUT.

INDICATOR.

1,348,162. Specification of Letters Patent. Patented Aug. 3, 1920.

Application filed October 21, 1919. Serial No. 332,168.

*To all whom it may concern:*

Be it known that I, ARTHUR G. FENN, a citizen of the United States, and a resident of Hartford, county of Hartford, State of Connecticut, have invented certain new and useful Improvements in Indicators, of which the following is a specification.

This invention relates to indicators for testing the trueness of various kinds of machine work and has as its aim to provide a test indicator provided with improved means having features of novelty and advantage for tensioning the indicating pointer or finger and adjusting the same to a variable zero position.

In the accompanying drawing, I have illustrated one embodiment of my invention, but it is to be understood that the present disclosure is illustrative only and not restrictive of my conception, for the device is susceptible of various modifications and changes which may come within the purview of the annexed claims.

In the accompanying drawing:—

Figure 1 is a plan view of a test indicator to which my improvements are applied.

Fig. 2 is a longitudinal sectional view thereof.

Fig. 3 is a perspective view on an enlarged scale of my improved means for tensioning and setting the pointer of the indicator, and Fig. 4 is a fragmentary view showing a detail of construction.

In Figs 1 and 2 of the drawing, I have shown, for illustrative purposes, my improvements applied to an old and well-known type of indicator. This indicator has a base $a$, a lever $b$ pivoted on the posts $c$, and an indicating pointer $d$ pivoted on posts $e$ and having its free end overlying a scale $f$. The forward end of the lever $b$ is adapted to be brought into contact with the work to be trued up. The rear end of the lever $b$ has a slot $h$ through which extends a pin $i$ carried by the pointer $d$ adjacent its pivoted end. The lower end of the pin $i$ extends into a recess $k$ at the rear end of the base $a$. With the construction so far described, it will readily be seen that upon a slight movement of the forward end of the lever $b$ the pointer $d$ will swing through a relatively greater arc over the scale $f$.

By my invention, I add to the above construction certain improvements which will now be described. 10 is a stud rotatably mounted in an opening in a boss 11 on the base and having a head 12 located in a circular seat at the forward end of the recess $k$. Connected to this head 12 is a pair of flat springs 13 which, at their free ends, straddle the lower end of the pin $i$. In the present instance, I have shown the springs 13 coöperating with the pin $i$ and, while this is the preferred arrangement, I do not wish to limit the invention thereto as a separate pin or part on the pointer or lever may be provided for this purpose. The ends of the springs 13 may be located in saw cuts in the head 12 of the stud, as shown in Fig. 3. Upon the lower end of the stud 10 is fixed a handle 14 preferably of spring material and having frictional engagement against the lower surface of the base $a$. Upon the outer end of the handle 14 is a pair of ears 15 straddling the base $a$ and these ears serve as thumb and finger pieces for ready manipulation of the handle. They also constitute stops to limit movement of the handle. To prevent relative rotation between the handle 14 and the stud 10, the opening in the handle and the portion of the stud which this opening receives are non-circular, in the present instance, the stud and opening being flattened at one side as indicated by the numeral 16, of Fig. 4. The parts are held in assembled position by a nut 17 threaded on the lower end of the stud 10.

It will be seen that with my construction, when it is desired to set the indicating pointer $d$ to any position on the scale, the handle 14 is manipulated to rotate the stud 10 and the springs 13 in the proper direction. Movement of the springs 13 changes the position of the pin $i$ and thus varies the angular positions of the lever $b$ and indicating pointer $d$. It requires but a slight rotary movement of the stud 10 to swing the free end of the indicating pointer $d$ through the full length of the scale as the springs 13 are relatively long. In any position of adjustment of the pointer, the springs 13 exert the same tension thereon for, when changed from one position to another, they rotate in unison with the stud 10 and the springs being flat the pin $i$ may have a slight movement therebetween so as to allow the pin $i$ and the spring to be swung about different centers. The pointer is held in any position of adjustment due to the frictional engagement of the handle 14 with the base $a$.

I claim as my invention:—

1. In an indicator of the class described, the combination with a base, a pivoted indicating pointer having a fixed part, and a lever operatively connected to the pointer adjacent the pivot of the latter, of a rotary stud carried by the base and spaced from the pivot of said pointer, a pair of springs carried by the stud and engaging said part fixed on said pointer, and means for rotating said stud.

2. In an indicator of the class described, the combination with a base, a lever pivoted thereon, a pivoted indicating pointer operatively connected to said lever, and a pin on said pointer, of a pair of angularly adjustable springs having straight free ends straddling said pin, and means for angularly moving said springs.

3. In an indicator of the class described, the combination with a base, a lever pivoted thereon, a pivoted indicating pointer, and a pin forming a connection between said lever and pointer, of a rotary stud, a pair of straight springs carried by the stud and straddling said pin, and means for rotating the stud.

4. In an indicator of the class described, in combination with a base, a lever pivoted thereon, a pivoted indicating pointer operatively connected to said lever, and a pin on said pointer, of a pair of angularly adjustable springs straddling said pin, and a resilient handle for adjusting said springs and having frictional engagement with said base.

5. In an indicator of the class described, in combination with a base, a lever pivoted thereon, a pivoted indicating pointer operatively connected to said lever, and a pin on said pointer, of a rotary stud on said base, a pair of springs carried thereby and straddling said pin, and a handle on said stud frictionally engaging said base and having at its face end ears between which the base is positioned.

6. In an indicator of the class described, in combination with a base, a lever pivoted thereon, a pivoted indicating pointer operatively connected to said lever, and a pin on said pointer, of a rotary stud on the base, a pair of straight springs carried thereby and straddling said pin, and a handle having an opening with a non-circular side receiving a correspondingly shaped part of the stud, said handle having frictional engagement with said base and having in its free end ears between which the base is positioned.

ARTHUR G. FENN.